United States Patent [19]

Bluethman et al.

[11] 4,095,277

[45] June 13, 1978

[54] METHOD FOR COMMUNICATING TEXT COMMANDS AND INSTRUCTIONS USING CONVENTIONAL CODED TEXT CHARACTERS AND A STRUCTURE FOR DECODING AND PRESENTING COMMAND AND INSTRUCTION SIGNALS

[75] Inventors: Robert Glenn Bluethman; William Weller Boyd, both of Austin, Tex.

[73] Assignee: International Business Machines Corporation, Armonk, N.Y.

[21] Appl. No.: 693,822

[22] Filed: Jun. 7, 1976

[51] Int. Cl.² ............................................. G06F 3/12
[52] U.S. Cl. ................................................. 364/900
[58] Field of Search ................ 340/172.5; 197/19; 101/93.01

[56] References Cited

U.S. PATENT DOCUMENTS

| | | | |
|---|---|---|---|
| 3,613,083 | 10/1971 | DeSandre | 340/172.5 |
| 3,958,224 | 5/1976 | Boyd et al. | 340/172.5 |

*Primary Examiner*—Raulfe B. Zache
*Attorney, Agent, or Firm*—John B. Frisone

[57] ABSTRACT

A control language using conventional text characters and a unique command and instruction delimiter whereby the commands and instructions which use conventional text characters may be detected and presented to a utilization device is shown. The control language facilitates the transmission of commands and instructions through existing data communication networks without alterations thereto. In addition, a structure suitable for scanning coded signals, detecting the unique delimiter and providing an indicia of commands and instructions is shown.

12 Claims, 20 Drawing Figures

METHOD FOR COMMUNICATING TEXT COMMANDS AND INSTRUCTIONS USING CONVENTIONAL CODED TEXT CHARACTERS AND A STRUCTURE FOR DECODING AND PRESENTING COMMAND AND INSTRUCTION SIGNALS

FIELD OF THE INVENTION

The invention relates to the field of communications in general and more particularly to data signaling techniques which permit the transmission of text data including conventional printer control signals and the like, as well as device commands and instructions using only a conventional set of text and control characters.

BACKGROUND OF THE INVENTION

In many on-line data processing systems, devices remote from each other and from the data processor may communicate with each other over a leased or dial line via the data processor and a connected communications control unit. Typically, such a system may include a multiplicity of remote devices connected via leased or dial lines to an IBM 3705 communications controller which is in turn channel connected to an IBM System 370 computer.

The devices may communicate, for example, using Extended Binary Coded Decimal Interchange Code (EBCDIC) and Binary Synchronous Line Control (BSC). The computer will, for example, be provided with a suitable access program such as the IBM Basic Telecommunications Access Method (BTAM). Other devices and access methods may also be used for effecting the desired device to device communication. The example set forth above is typical of such a connection.

The code set provided in EBCDIC is fixed, however, and provides limited text and control codes. In those instances where the devices communicating with each other require commands and/or instructions not provided in the EBCDIC code set, some provision must be made to encode and communicate these commands and/or instructions from one device to the other via the intervening devices and access programs set forth above as examples. In many access methods new codes not provided for in the code set, such as EBCDIC, are stripped or mutilated by the access program. When this takes place, the commands and/or instructions fail to reach or are mutilated before reaching the recipient device. In either event, the received message, including the commands and/or instructions will not be suitable for use at the recipient device.

Several prior solutions to the above problem are available. None of these solutions is fully satisfactory for a variety of reasons. The access method can be modified to accommodate additional codes which will permit encoding of the necessary commands and instructions. This solution is totally unacceptable in view of the time, effort, and cost of modifying an existing access method. Another solution is to utilize a rigidly formatted command instruction and text format. Such a solution incurs a modest additional cost in machine development and manufacturing which is tolerable from this point of view. However, it requires skilled or trained operators. In machines intended for secretarial personnel unskilled in data processing, use of such a rigid format would inhibit productivity and incur substantial training cost and is, therefore, undesirable.

SUMMARY OF THE INVENTION

The invention contemplates a flexible unstructured method for communicating text, commands, and instructions in which all commands and instructions are coded in conventional text and control characters and which may be intermingled with text in a flexible unstructured format. The commands and instructions are preceded by a conventional control character signifying line end (LE) immediately followed by a conventional text character signifying a comma (,). These characters are followed by a command and any following instructions, as required for controlling the operation of the recipient equipment, are preceded by the said LE character or an underscore (USC) character. A single command, instruction or combination thereof is terminated by a conventional control character signifying page end (PE) or by a comma (,) followed by the end command (END). When the page end character is inserted, the following characters are reproduced as text by the recipient equipment. The (LE), combination in a textual environment is unique since this combination does not normally occur in text and a prohibition of the combination in text imposes substantially no penalty on operation or function. In addition, the combination is constructed from conventional control and text characters such as are found in EBCDIC thus causing no difficulties with existing access methods capable of working with such codes. Its use provides a completely flexible unstructured format for text, commands and instructions.

DETAILED DESCRIPTION OF THE DRAWINGS

Figure 1:
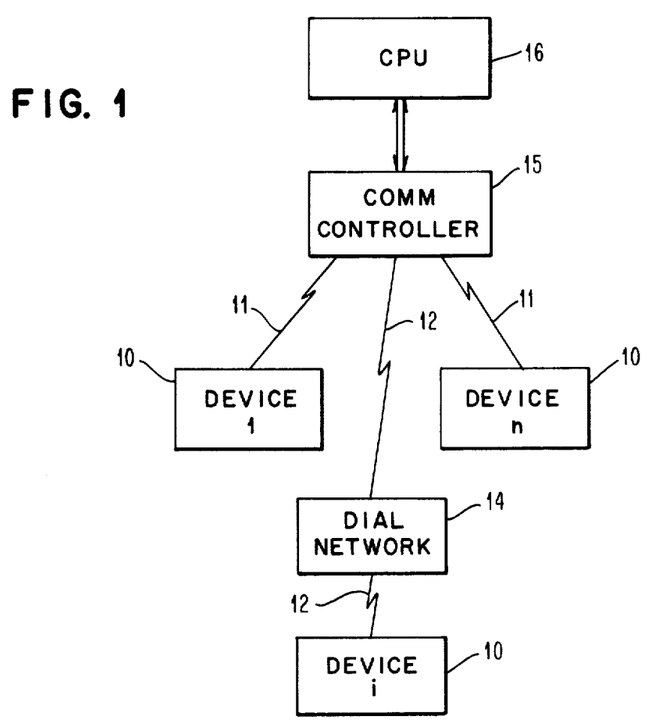
FIG. 1 is a block diagram of a communictions network suitable for communicating text, commands and instructions according to the invention.

In FIG. 1 a plurality of devices 10, capable of transmitting and receiving text, commands and instruction signals are shown interconnected to each other by leased lines 11 and dial lines 12 which include other components of a dial network 14 such as exchanges and trunk lines. The leased and dial lines from the devices 10 terminate in a communications controller 15 which is connected to a CPU 16 by a local channel. A message including text, commands and instruction signals is transmitted by a device using a line control, such as BSC, to the computer which retransmits the same after processing and storage to another device 10 or to a locally resident application program for further processing. In any event, the signals from the transmitting device are handled by a communications access method such as BTAM resident in the CPU. As pointed out above, this places constraints on the signal codes employed for transmitting the commands and instructions. This figure is presented here to illustrate one environment in which the invention is of particular value.

Figure 2:
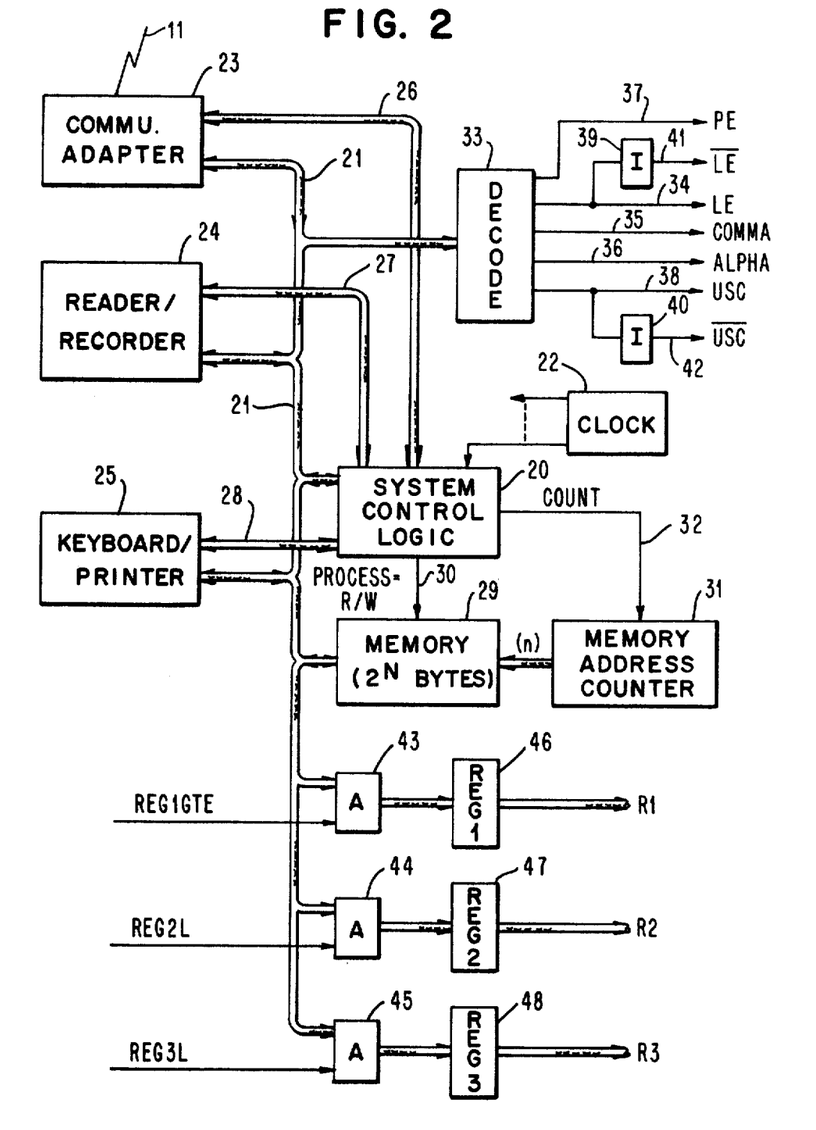
FIG. 2 is a block diagram of those circuits in a communicating device for detecting and signaling the delimiters, commands and instructions and text according to the invention.

FIG. 2 is a block diagram of a device 10 which is architecturally structured similar to the IBM 3653 Retail Store Terminal which is a component of the IBM 3650 Retail Store System. Device 10 includes system control logic 20 which may consist of hard wired logic or a microprocessor and a control program stored in read only storage or random access memory. Alternatively, a combination of both techniques can be utilized. For the purpose of illustrating the invention, those functions performed by control logic 20 related to the invention are illustrated in hard wired logic in FIGS. 3A through 3M and will be described in detail later.

System control logic 20 governs the operation of device 10. It is connected to an input/output bus 21 whereby text, commands and instruction signals may be applied to the internal circuits. A system clock 22 provides clocking signals to the control logic 20. A communications adapter 23, a magnetic card reader/recorder 24 and a keyboard printer 25 are also connected to the bus 21 and receive from and place thereon text, command and instruction signals. Bidirectional control lines 26, 27 and 28 interconnect the control logic 20 with devices 23, 24 and 25, respectively.

A memory 29 is connected to the bus 21 for supplying and receiving text, command and instruction signals and to control logic 20 by a conductor 30 for receiving control signals therefrom. A memory address counter 31 receives control signals from control logic 20 via a conductor 32. Counter 31 is set and incremented by the control logic 20 and controls the address in memory 29 at which a read or write operation will occur under control of signals via 30 from the control logic 20.

A decoder circuit 33 connected to bus 21 looks for and decodes unique bit combinations on the bus 21 signifying the line end signal (LE), the comma (,), the alphabetic character (alpha), the page end (PE) and the underscore (USC). When these signals are decoded, the decoder provides a signal on lines 34, 35, 36, 37 and 38, respectively. Alphabetic characters in EBCDIC have bit pattern characteristics which differ from numerics and other type characters and are easily distinguished therefrom. Output lines 34 and 38 are connected to inverters 39 and 40, respectively, to provide inverse signals on lines 41 and 42, respectively. The lines 34, 35, 36, 37, 38, 41 and 42 are connected (not shown in this drawing) to the control logic 20. How the signals on these lines are utilized will be described in greater detail in connection with the description of FIGS. 3A-3M.

In, for example, a system using EBCDIC code, three eight bit wide gates 43, 44 and 45 are connected to the bus 21. Gate 43 receives a control signal (REG1GTE) from control logic 20 which when supplied operates gates 43 to load the contents of the bus 21 into a register 46, the outputs of which (R1) are returned to the control logic 20. In a similar manner, control signals (REG2L) and (REG3L) from control logic 20 load the contents of bus 21 into registers 47 and 48, respectively, via gates 44 and 45, respectively. The outputs (R2) and (R3) of registers 47 and 48, respectively, are returned to control logic 20.

In order to help in understanding the invention, listed below are several examples of valid commands and instructions and their significance.

| COMMANDS | |
| --- | --- |
| LE, PRINT | Indicates the beginning of a new job to be printed. |
| LE, MODIFY | Indicates that the following instructions are to be changed to new values; however, the same job is to continue. This command facilitates the inclusion of instruction within text. |
| LE, END | Used to terminate an instruction list and terminates command mode. A page end code (PE) will also perform this function. |
| LE, SEND | Used to cause transmission of the job that follows. |
| INSTRUCTIONS | |
| LE MARGIN LEFT X | Position of the left margin for this job is X characters from the left edge of the paper. |
| LE ADJUST X | Adjust lines so that no line exceeds a right margin of X characters from left edge. |
| LE FIRST LINE X | Document is to begin printing x lines from top edge of paper. |
| LE LAST LINE X | No line is to print below X lines from top edge. |
| LE TABS X1 X2 X3 | Set tab stops at positions X1, X2 and X3 characters from left edge. |
| LE HOLD LINE | When transmitting, do not drop the line in the event of line inactivity. |
| LE REMOTE DEVICE X | When transmitting, select remote device X to receive the transmission. |

Below are listed five examples of jobs which typically could be prepared by an operator on an IBM Magnetic Card Selectric typewriter. The jobs can be prepared using separate control cards and text cards or control and text can be comingled on the same card. Where separate cards for control and text are utilized, the page end (PE) code can be used to terminate the command mode. Where control and text are comingled on the cards, the command LE, END is used to terminate command mode. Thus, the next card is not selected and text on the card following the end command follows. The control and text described below can be inserted in the memory from the card reader 24. Alternatively, it could be inserted via the keyboard 25 or from a remote device via the communications adapter 23. The insertion in memory is under the control of signals between the system control logic 20 and the device supplying the information over the appropriate control lines. The actual signals set forth below are placed on the bus 21 for transfer to or from the memory 29.

EXAMPLES:
1) Normal print job. All format instructions at their standard (default) values.
```
Control Card:          LE, PRINT
                       (PE)
Data Cards:            Text
                         .
                         .
                         .
```

2) Normal print job with instructions specified.
```
Control Card:          LE, PRINT
                       LE First line 8
                       LE Tabs 20 40
                       LE Adjust 72
                       LE Margin left 15
                       LE Last line 58
                       (PE)
Data Cards:            Text
                         .
                         .
                         .
```

3) Normal print job with instruction changes embedded in text.
```
Control Card:          LE, PRINT
                       LE First line 7
                       LE Tabs 15 25 40
                       LE Margin left 10
                       (PE)
Data Cards:            Text
```

-continued

```
                            LE, MODIFY
                            LE Tabs 20 30 50
                            LE, END
                            Text
      .
      .
4) Send with standard communication parameters.
   Communications Control    LE, SEND
   Card:                     (PE)
   Print Control             LE, PRINT
   Card:                     LE Margin left 15
                             (PE)
   Data Cards:               Text
      .
      .
5) Send with instructions specific to communications
   and all print job instructions on one card.
   Control Card:             LE, SEND
                             LE Remote device 1
                             LE Hold line
                             LE, PRINT
                             LE First line 10
                             LE Adjust 66
                             (PE)
   Data Cards:               Text
      .
      .
```

In the following description of the operation of the circuits of FIG. 2 related to the invention, it will be assumed that the memory 29 is loaded with a job which is to be checked by the circuits concerned. The control logic 20 will initiate memory read cycles at an address selected by the counter 31 and the signals in successive memory address will be placed on the bus 21. These signals will be examined by decoder 33. Detection of the line end (LE) followed by the comma (,) will cause the contents on bus 21 in the byte time immediately following the comma (,) to be inserted in register 46. The next two bytes will be inserted in registers 47 and 48, respectively. At this time memory operation is suspended. The circuits shown in greater detail in FIGS. 3A–3M analyze the contents of registers 46, 47 and 48 and provide status and information signals relative thereto to the portions of the control logic 20 dedicated to system operation. These portions are not illustrated here since they are unrelated to this invention. After the system operations have been completed, a second start takes place and decoder 33 resumes scanning the signals on bus 21.

If the contents of memory 29 included the characters illustrated in example 4 following the detection of (LE) (,), the characters SEN would reside in registers 46, 47 and 48. These would be presented to the system along with some status signals which will be described in greater detail later. Scanning stops and restarts later under the control of logic 20. After it restarts (PE) is decoded and causes the command mode to terminate. Detection of the (LE) (,) restores command mode and the characters PRI are stored in registers 46, 47 and 48. These characters and appropriate status signals are now presented. The sequence continues through the subsequent MARGIN instruction and ends with the following (PE). Thereafter, the text is scanned, but no action takes place. In Example 3, however, the MODIFY command restores command mode within a text run and the following instructions are detected, decoded and presented as described above. The END command ends command mode and restores text mode which continues to the end of the signals.

Figure 3A:
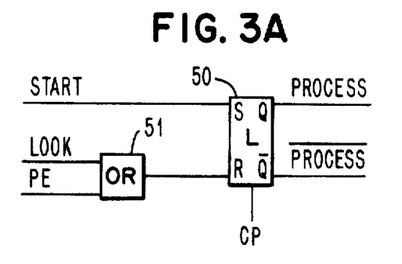
FIGS. 3A–3M are detailed circuit diagrams of circuits used in FIG. 2.
Figure 3B:
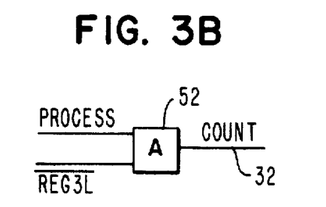

The detailed circuits responsible for performing the functions described above are illustrated in FIGS. 3A–3M. In FIG. 3A a START signal from logic 20 sets a latch 50 which provides the PROCESS signal supplied memory 29 over line 30. The page end signal (PE) from decoder 33 and a signal LOOK are applied via an OR gate 51 to the reset input of latch 50 which sets or resets on a clock pulse (CP) from clock 22 depending on the state of the inputs. FIG. 3B includes an AND gate 52 which provides a COUNT signal when latch 50 is set and provides the PROCESS signal, and the signal $\overline{REG3L}$ is present at the correct level. The COUNT signal via conductor 32 causes counter 31 to advance at the appropriate clock rate when present. The circuits shown in FIGS. 3A–3M are interactive with each other and the generation of signals such as $\overline{REG3L}$ will become apparent as the description continues. This technique of illustrating the circuits is believed to simplify the description and enhance understanding over a single complex figure with all the interconnections illustrated.

Figure 3C:
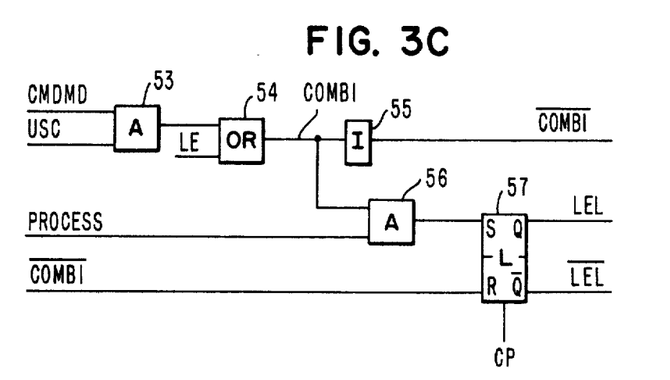

In FIG. 3C a command mode signal CMDMD and the underscore signal USC from decoder 33 are applied to an AND gate 53. The output of gate 53 and the line end LE signal from decoder 33 are applied to an OR gate 54 which provides an output COMB1. This output and PROCESS via an AND gate 56 combine to set a latch 57 which when set provides a signal LEL. The output of gate 54, COMB1, is applied to an inverter 55 which provides a signal $\overline{COMB1}$. This signal is used to reset latch 57. The setting and resetting of latch 57 occurs with a clock pulse CP as described above.

Figure 3D:
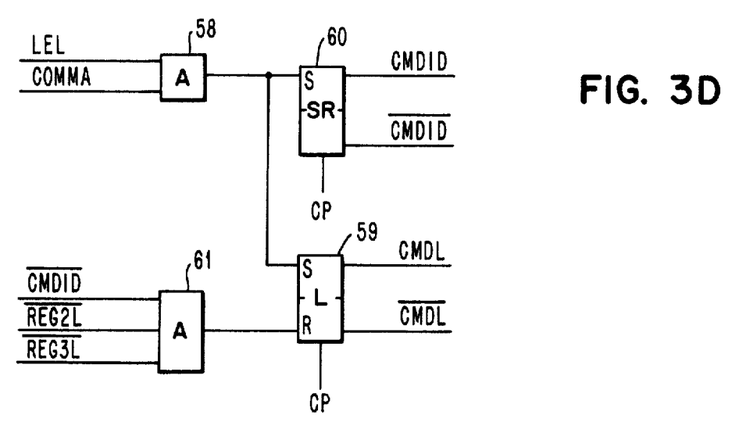

The LEL signal from latch 57 and the COMMA signal from decoder 33 are applied via an AND gate 58 to the set input of a Latch 59 which provides an output CMDL when set and to the input of a one bit shift register 60 which provides a signal CMDID when a "one" is stored and a signal $\overline{CMDID}$ when a "zero" is stored. Register 60 is shifted by the clock pulses CP. Signals $\overline{CMDID}$, $\overline{REG2L}$ and $\overline{REG3L}$ are connected to a three input AND gate 61 which has its output connected to the reset input of latch 59. Latch 59 sets and resets upon the occurrence of a clock pulse CP and the appropriate signal levels at the inputs.

Figure 3E:
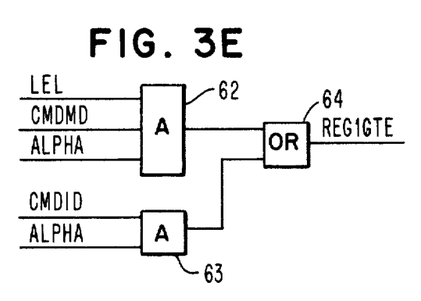

The circuit illustrated in FIG. 3E provides the REG1GTE signal described in FIG. 2. A first AND gate 62 receives three signals LEL, previously described, CMDMD, to be described later which indicates command mode, and the ALPHA signal from decoder 33. A second AND gate 63 receives the CMDID signal from latch 60 and the ALPHA signal from decoder 33. The outputs of gates 62 and 63 are applied to an OR gate 64 which provides the REG1GTE signal when either AND gate 62 or 63 is properly conditioned.

Figure 3F:
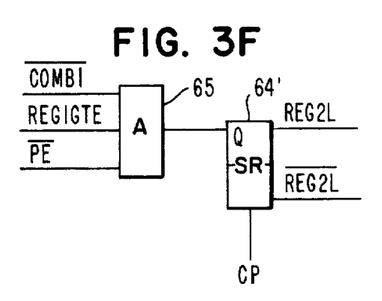
Figure 3G:
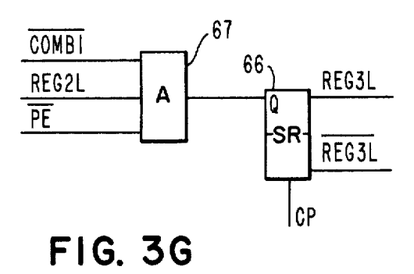
Figure 3H:
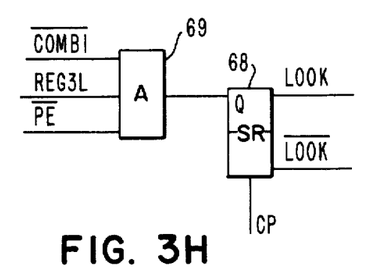

The circuit of FIG. 3F provides the REG2L signal previously described and a signal $\overline{REG2L}$. This circuit includes a one bit shift register 64' which is identical to shift register 60 previously described. The set input of the register 64' is connected to the output of a three way AND gate 65. The three signals applied to gate 65 are $\overline{COMB1}$, REG1GTE and $\overline{PE}$, all previously described. The circuit of FIGS. 3G and 3H are substantially identical to FIG. 3F described above. Each includes a one bit shift register 66 and 68 and a three way AND gate 67 and 69, respectively. The signals applied to gate 67 are $\overline{COMB1}$, REG2L and $\overline{PE}$. The same signals are applied to gate 69 except REG3L is applied in lieu of REG2L. The outputs REG1GTE, REG2L, REG3L and LOOK occur in sequence in subsequent byte times as described above.

Figure 3I:
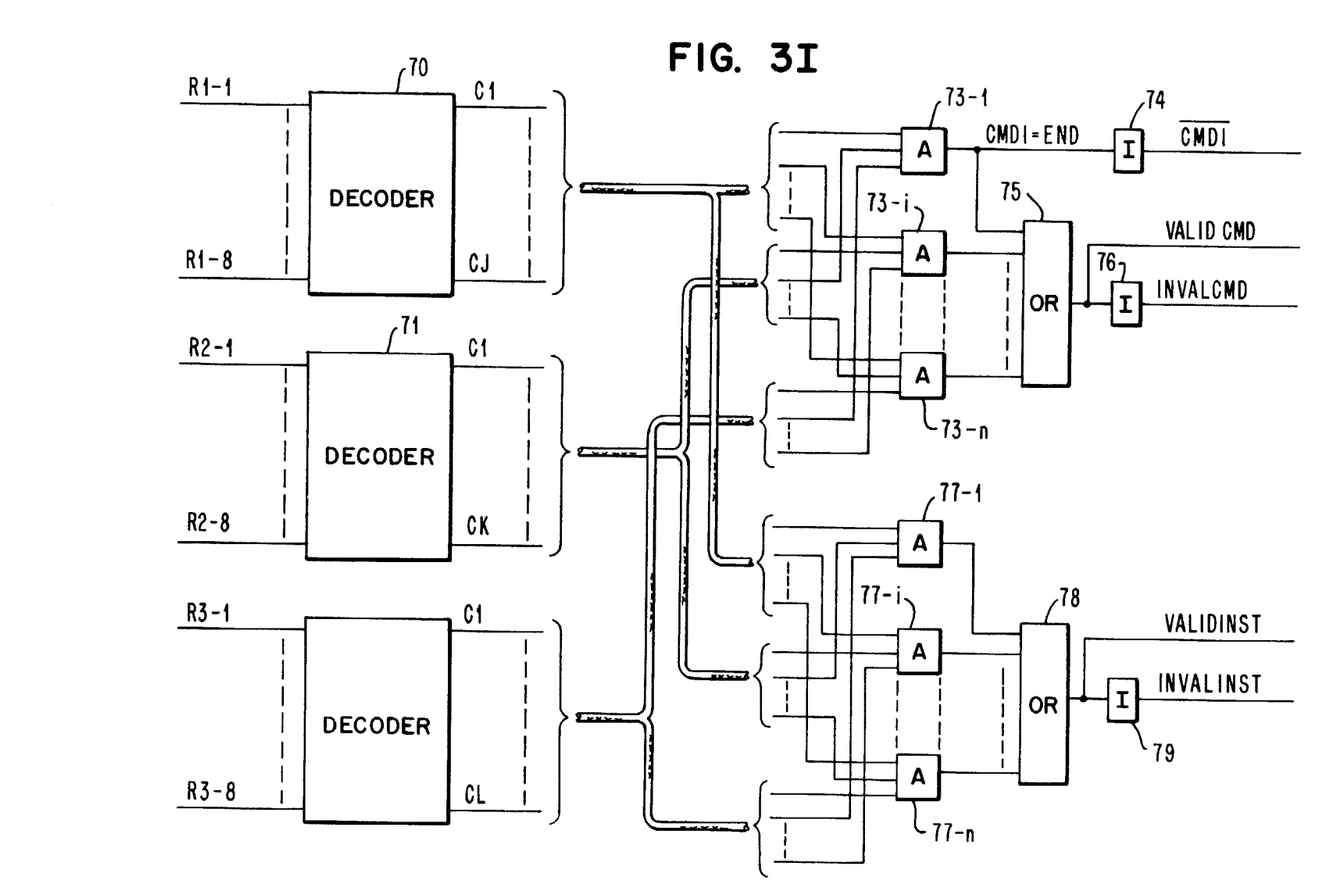

The circuit illustrated in FIG. 3I performs a decoding function on the outputs R1, R2 and R3 of registers 46, 47 and 48, respectively. The decoder decodes both commands and instructions and provides an indication of a valid or invalid command or instruction resident in registers 46, 47 and 48. The outputs of registers 46, 47 and 48 are applied to decoders 70, 71 and 72, respectively. Decoders 70, 71 and 72 provide J, K and L outputs, respectively. Each output represents one of the valid or allowable command and instruction characters in the first, second and third character positions, respectively, of valid commands and instructions. A first group of n AND gates 73-1 to 73-n are each connected to one J, K and L output line and provides an output identifying one command when properly conditioned. The J, K and L lines from decoders 70, 71 and 72 connected to AND gate 73-1 are E, N and D, respectively, the END command and called CMD1. The output of gate 73-1 is applied to an inverter 74 which provides an output $\overline{CMD1}$. Gates 73-1 through 73-n are connected to an OR gate 75 which provides an output VALID CMD. An inverter 76 provides an output INVAL CMD. A group of AND gates 77-1 through 77-n, an OR gate 78 and an inverter 79 provide the same outputs for instructions as the corresponding circuits described above do for commands.

Figure 3J:
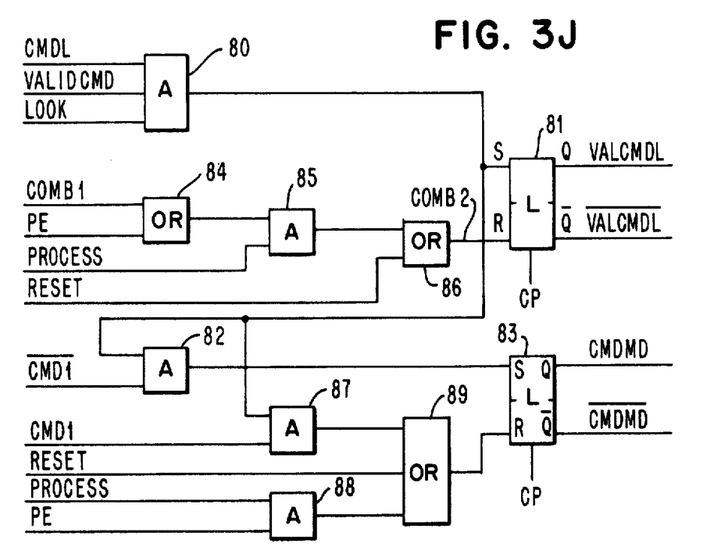

The circuit illustrated in FIG. 3J provides the VALCMDL, $\overline{VALCMDL}$, CMDMD, $\overline{CMDMD}$ and COMB2 signals. A three way AND gate 80 receives CMDL, VALIDCMD and LOOK. The output of gate 80 sets a latch 81 which provides the VALCMDL signal when set and the $\overline{VALCMDL}$ signal when reset. The output of gate 80 is anded in an AND gate 82 with $\overline{CMD1}$ to set a latch 83 which provides the CMDMD signal when set and the $\overline{CMDMD}$ signal when reset. An OR gate 84, an AND gate 85 and an OR gate 86 reset latch 81 when [(COMB1+PE) · PROCESS] + RESET = 1. AND gates 80, 87 and 88 and OR gate 89 reset latch 83 when (CMDL · VALID CMD · LOOK · CMD1) + (PROCESS · PE) + RESET = 1.

Figure 3K:
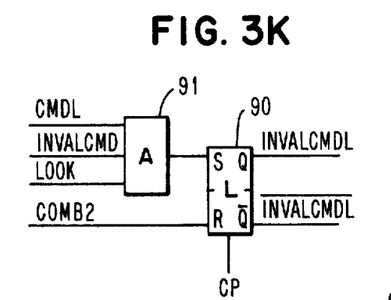
Figure 3L:
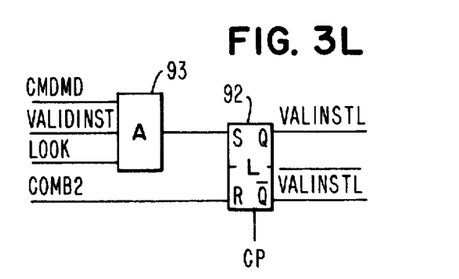
Figure 3M:
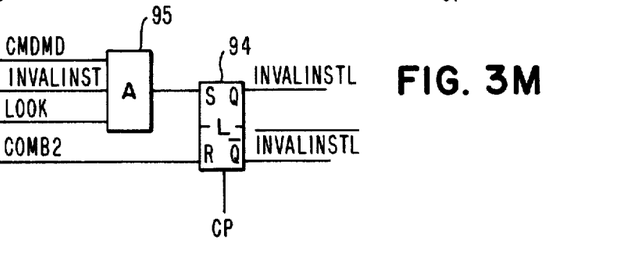

The circuits illustrated in FIG. 3K provide the INVALCMDL signal when set and $\overline{INVALCMDL}$ signals when reset. A latch 90 has its set input connected to the output of a three way AND gate 91 which receives the CMDL, INVALCMD and LOOK signals. The latch is reset by the COMB2 signal. The circuits illustrated in FIGS. 3L and 3M are similar in construction and include latches 92 and 94 and AND gates 93 and 95, respectively. Both latches are reset by the COMB 2 signal. Latch 92 is set when CMDMD · VALID INST · LOOK = 1 and provides the VALINSTL signal. When reset the latch provides the $\overline{VALINSTL}$ signal. Latch 94 is set when CMDMD · INVALINST · LOOK = 1 and provides the INVALINSTL signal. When reset the latch provides the $\overline{INVALINSTL}$ signal.

Figure 4A:
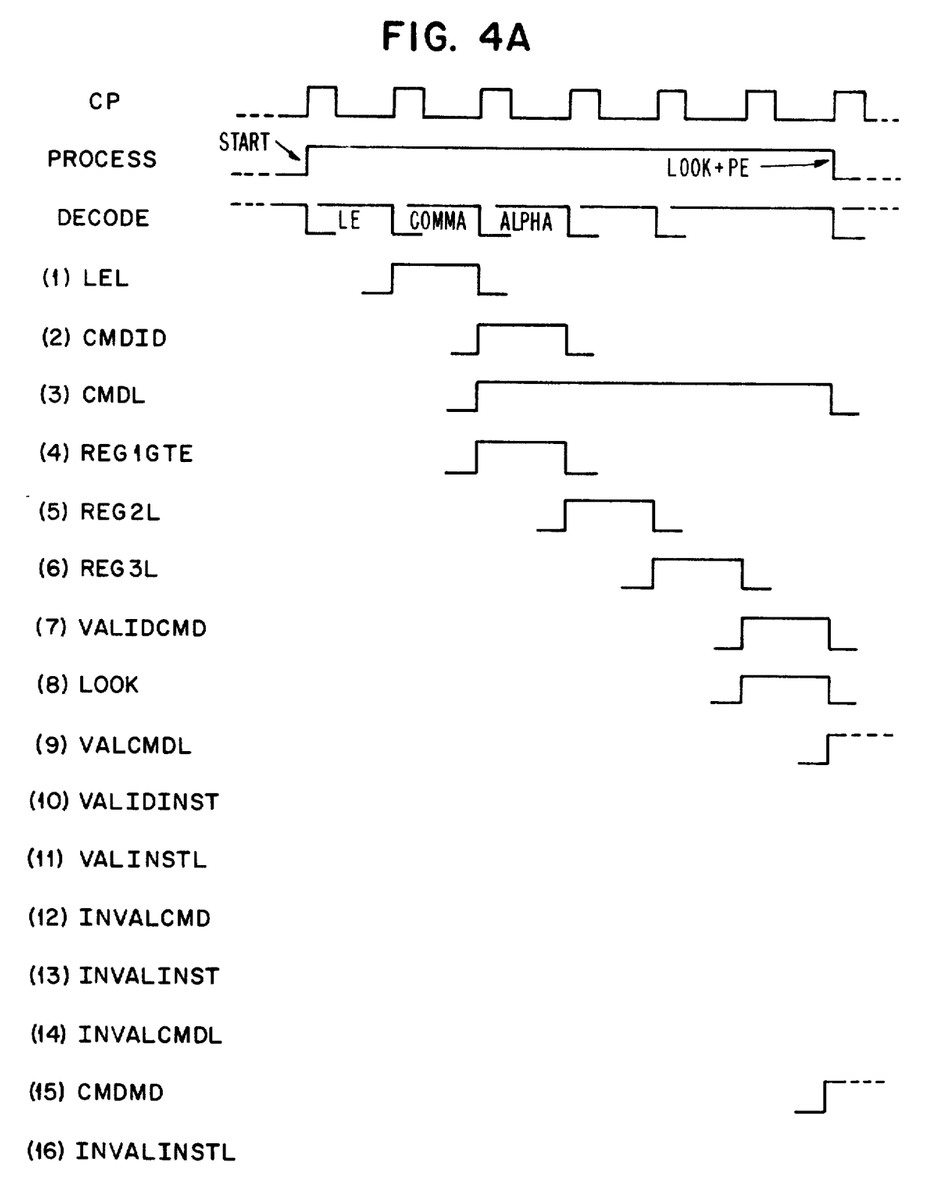
FIGS. 4A–4E are timing diagrams illustrating the sequential operation of the circuits in FIGS. 2 and 3A–3M.
Figure 4B:
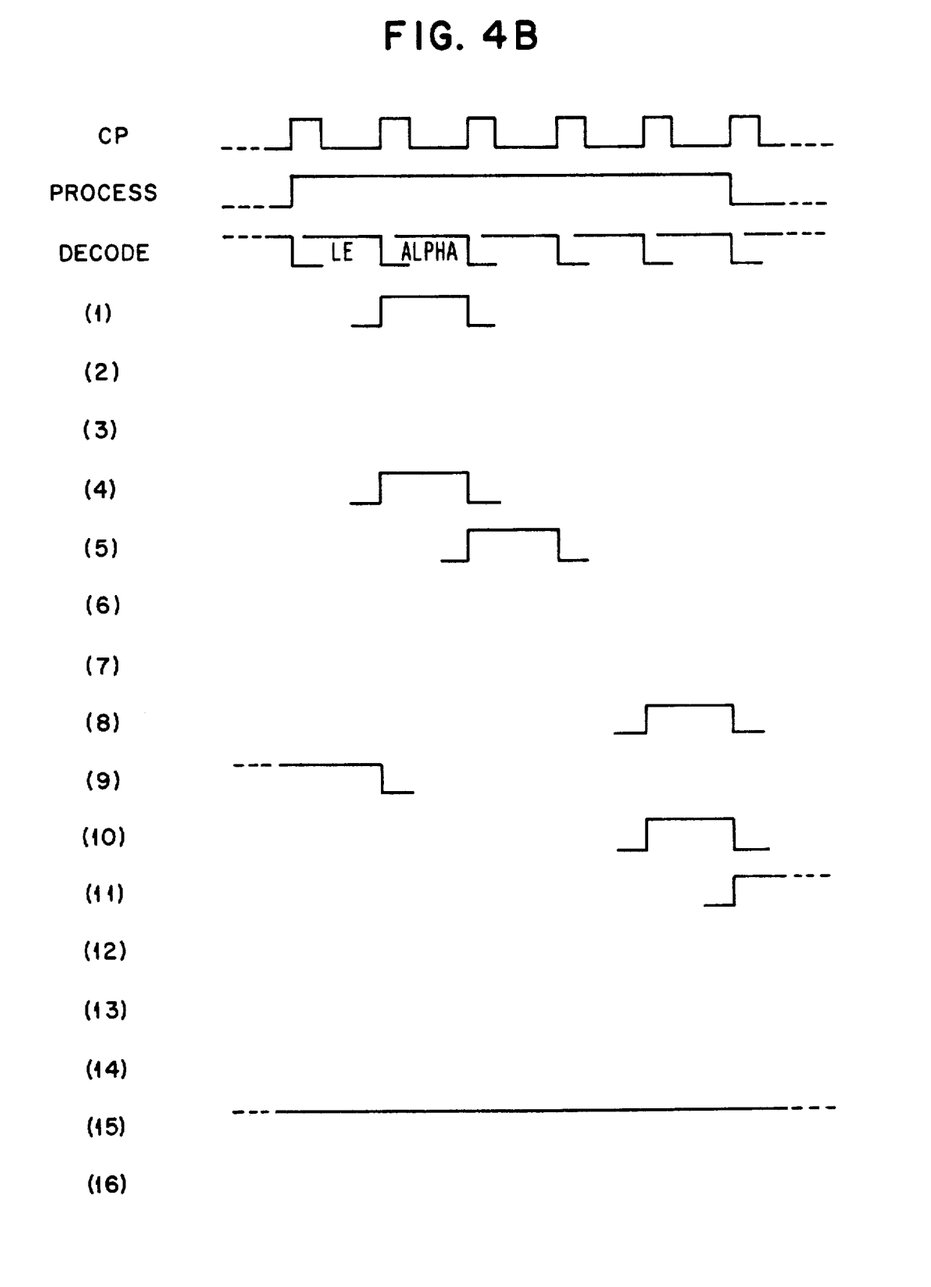
Figure 4C:
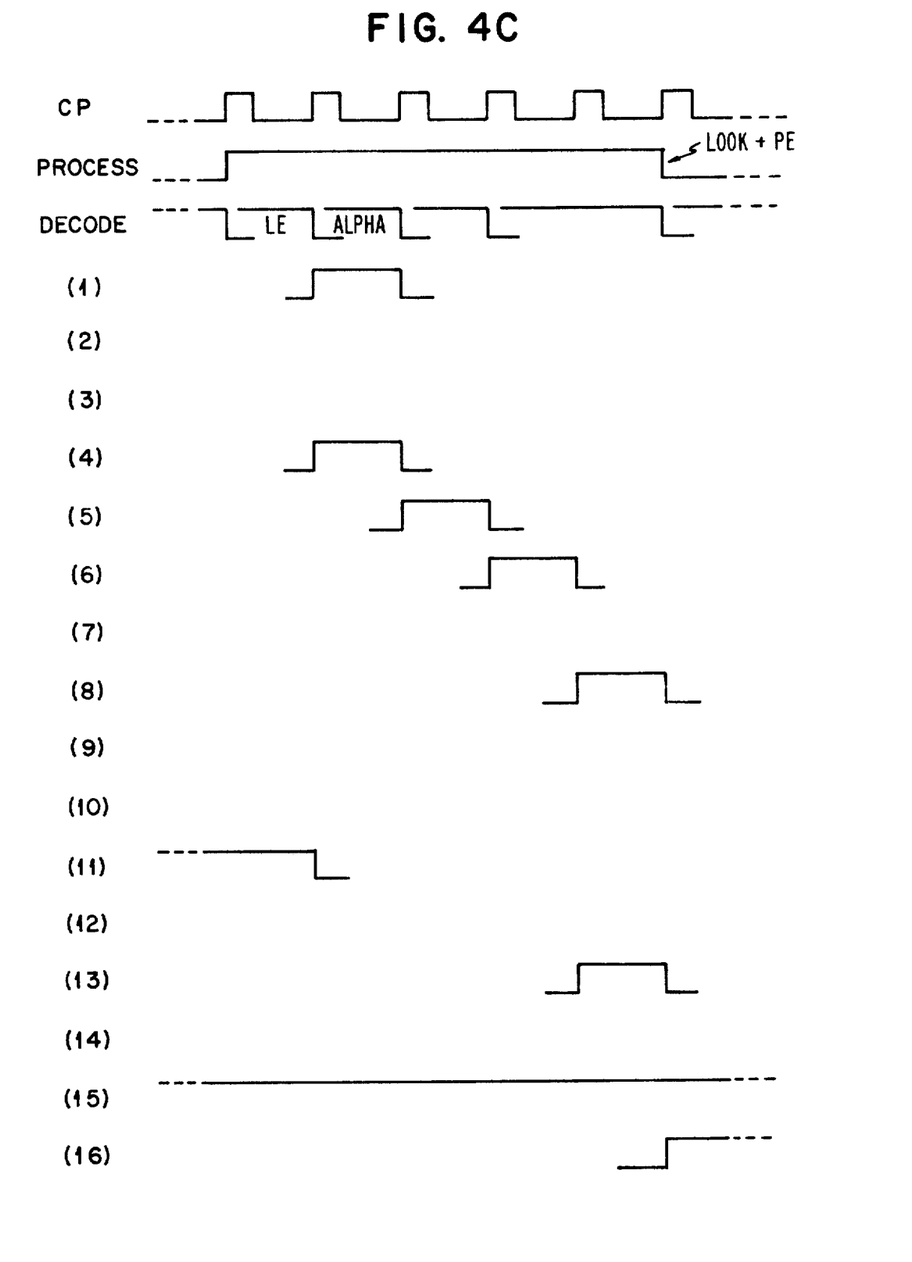
Figure 4D:
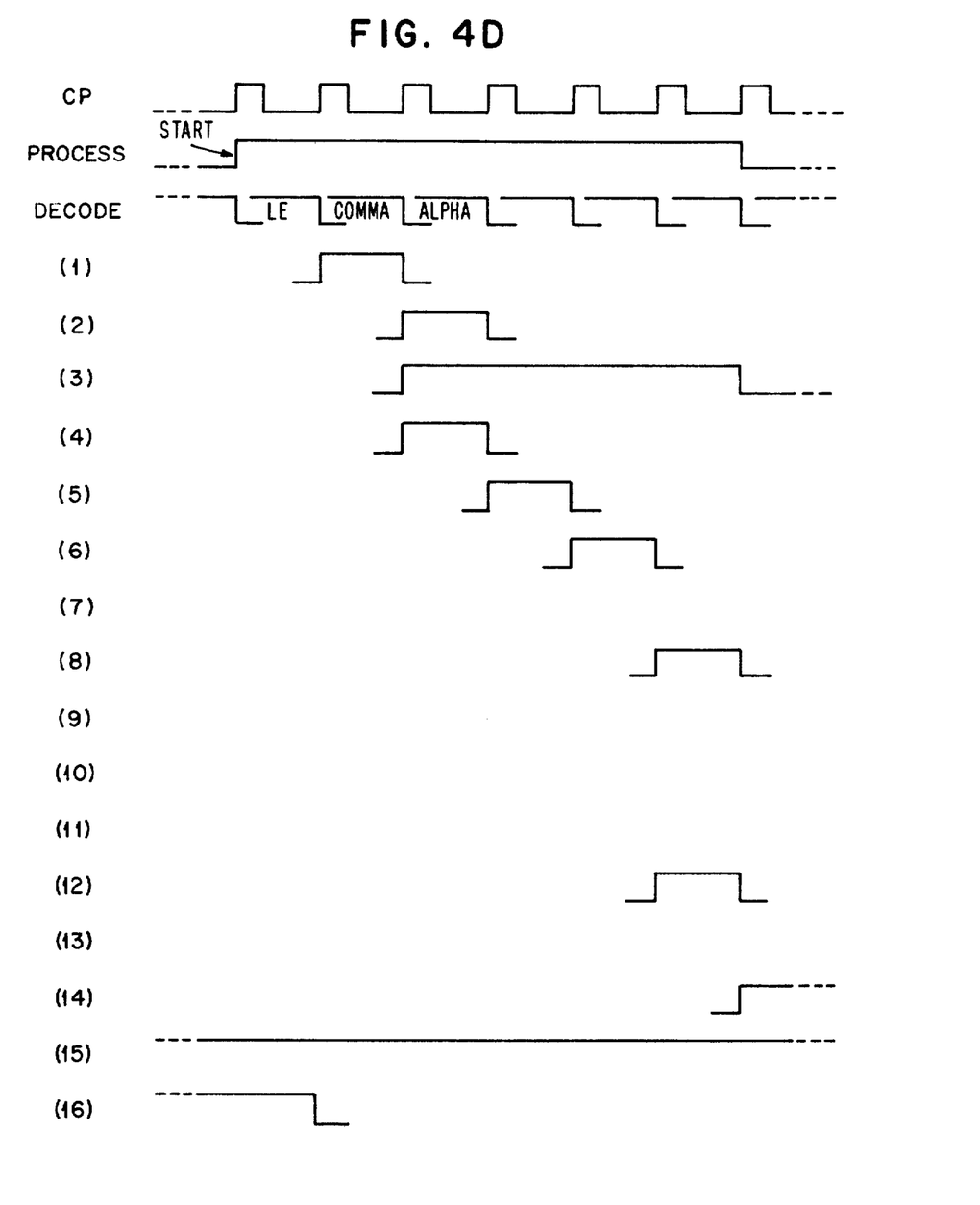
Figure 4E:
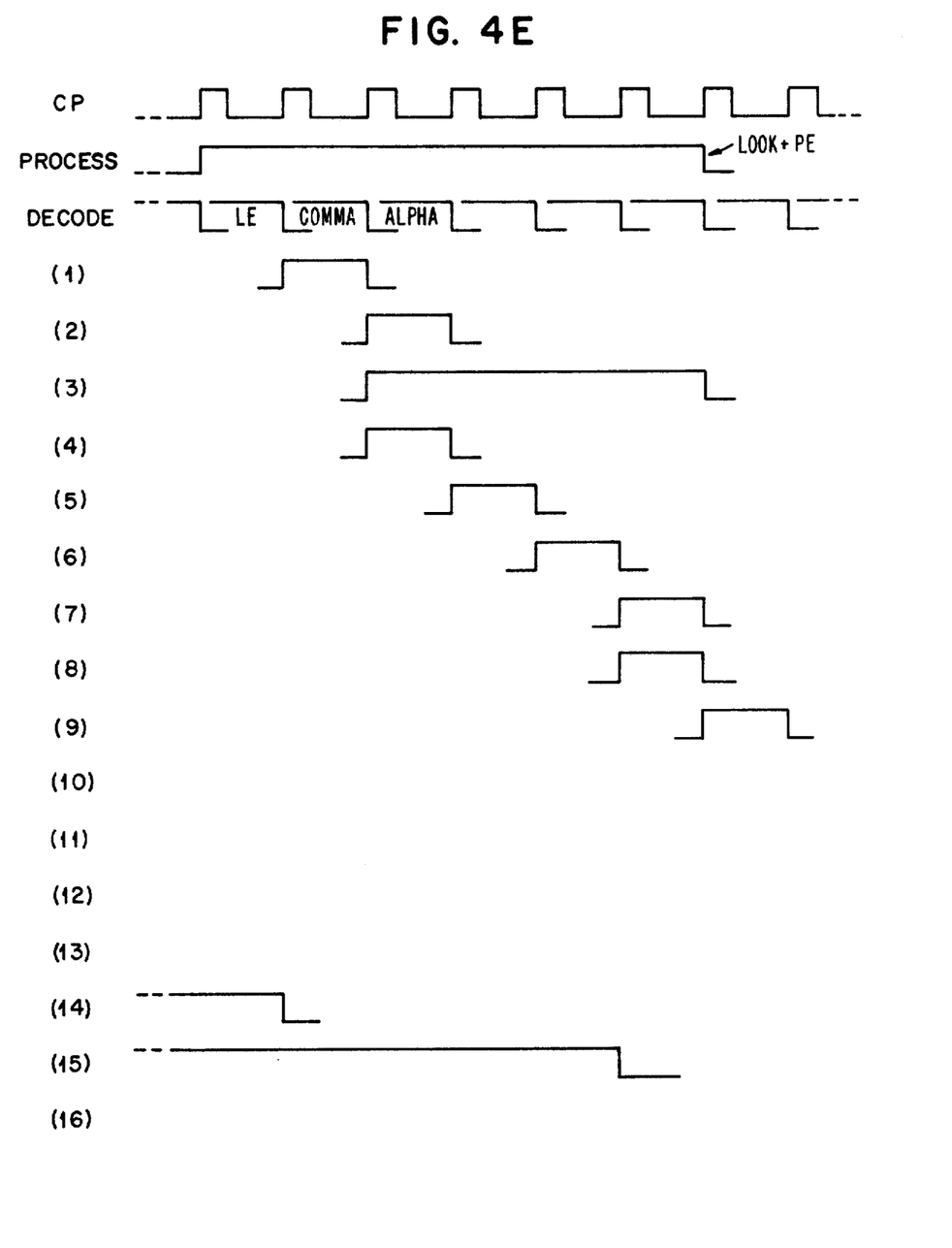

FIGS. 4A–4E are timing charts which illustrate the relative timings of the signals described above. The five figures show a sequence of valid and invalid commands and instructions. FIG. 4A illustrates a valid command; FIG. 4B illustrates a valid instruction; FIG. 4C illustrates an invalid instruction, and FIG. 4D an invalid command. FIG. 4E illustrates the termination of the command mode with the resetting of the CMDMD latch 83.

For ease of following the charts, all of the signals illustrated are listed below and given a number which is used in the charts to identify the signal. In addition, the list below includes the conditions which turn on the signal and, where appropriate, terminate the same.

| NO. | NAME | ON;OFF |
|-----|------|--------|
| (1) | LEL: | PROCESS[(CMDMD) (USC) + LE]; |
| (2) | CMDID: | $(\overline{LE})(\overline{CMDMD}) + (\overline{LE})(\overline{USC})$<br>(LEL)(COMMA);CP |
| (3) | CMDL: | (LEL)(COMMA); |
| (4) | REG1GTE: | $(\overline{CMDID})(\overline{REG2L})(\overline{REG3L})$<br>(CMDID) (ALPHA) for commands<br>(LEL) (CMDMD) (ALPHA) for instructions<br>Note: fixed time period no reset. |
| (5) | REG2L: | $[\overline{(CMDMD)(USC)} + LE]$ (REG1GTE)<br>$(\overline{PE})$;<br>CP |
| (6) | REG3L: | $[\overline{(CMDMD)(USC)} + LE]$ (REG2L)<br>$(\overline{PE})$;<br>CP |
| (7) | VALIDCMD: | decoder Figure 3I |
| (8) | LOOK: | $[\overline{(CMDMD)(USC)} + LE]$ (REG3L)<br>$(\overline{PE})$;<br>CP |
| (9) | VALCMDL: | (CMDL) (VALIDCMD) (LOOK);<br>[LE + PE + (CMDMD) (USC) ]Process + RESET = COMB2 |
| (10) | VALIDINST: | decoder Figure 3I |
| (11) | VALINSTL: | (CMDMD) (LOOK) (VALIDINST);<br>COMB2 |
| (12) | INVALCMD: | decoder Figure 3I |
| (13) | INVALINST: | decoder Figure 3I |
| (14) | INVALCMDL: | (CMDL) (INVALCMD) (LOOK);<br>COMB2 |
| (15) | CMDMD: | (CMDL) (VALIDCMD)<br>(LOOK) $(\overline{CMD1})$;<br>(CMDL) (VALIDCMD)<br>(LOOK) (CMD1) + (PE)<br>(PROCESS) + RESET |
| (16) | INVALINSTL: | (CMDMD) (INVALINST) (LOOK);<br>COMB2 |

In the description line end (LE) and page end (PE) were described as conventional printer control characters. While these terms have acquired broad usage, they are not universal and other terminology is sometimes used for describing the same printer functions. For example, the line end (LE) is sometimes referred to as carriage return and page end (PE) as form feed. These differences will be apparent to those skilled in this art.

While the invention has been particularly shown and described with reference to a preferred embodiment thereof, it will be understood by those skilled in the art that various changes in form and details may be made therein without departing from the spirit and scope of the invention.

What is claimed is:

1. A method of transmitting conventional coded text and printer control signals representing text, printer control, command and instruction signals in a transparent and unstructured format comprising the steps of:
   providing a command delimiter including a conventional line end signal (LE) and a conventional comma signal (,) immediately preceding each command to be transmitted for entering a command mode;
   encoding a following command in conventional alphabetic characters of which at least the first character represents the command;

providing an instruction delimiter including a conventional line end signal (LE) for each concatenated instruction following a command;

encoding a following instruction in conventional alphabetic characters of which at least the first character represents the instruction; and providing a conventional page end (PE) character following commands and instructions as set forth above for terminating the command mode and returning to text mode in which a recipient device will reproduce all conventionally encoded text characters received and utilize as device control characters all conventional encoded control characters received.

2. A method as set forth in claim 1 in which said commands and instructions encoded in conventional alphabetic characters are ordinary English words descriptive of the command or instruction and at least the first character of each identifies the command.

3. A method as set forth in claim 2 in which selected instructions include formatted conventionally coded numeric fields following the conventional alphabetic coded instruction for identifying system parameters.

4. A method as set forth in claim 3 in which the first three conventionally coded alphabetic characters of commands and instructions uniquely identify the commands and instructions whereby the remaining conventionally coded alphabetic characters are ignored by the recipient device and the immediately following conventionally encoded numeric characters are formatted in accordance with the immediately preceding conventionally encoded instruction.

5. A method of transmitting conventional coded text and printer control signals representing text, printer control, command and instruction signals in a transparent and unstructured format comprising the steps of:

providing a command delimiter including a conventional line end signal (LE) and a conventional comma signal (,) immediately preceding each command to be transmitted for entering a command mode;

encoding a following command in conventional alphabetic characters of which at least the first character represents the command;

providing an instruction delimiter including a conventional line end signal (LE) for each concatenated instruction following a command;

encoding a following instruction in conventional alphabetic characters of which at least the first character represents the instruction; and providing a command delimiter as set forth above and an end command (END) following commands and instructions as set forth above for terminating the command mode and returning to text mode in which a recipient device will reproduce all conventionally encoded text characters received and utilize as device control characters all conventionally encoded control characters received.

6. A method as set forth in claim 5 in which said commands and instructions encoded in conventional alphabetic characters are ordinary English words descriptive of the command or instruction and at least the first character of each identifies the command.

7. A method as set forth in claim 5 in which selected instructions include formatted conventionally coded numeric fields following the conventional alphabetic coded instruction for identifying system parameters.

8. A method as set forth in claim 5 in which the first three conventionally coded alphabetic characters of commands and instructions uniquely identify the commands and instructions whereby the remaining conventionally coded alphabetic characters are ignored by the recipient device and the immediately following conventionally encoded numeric characters are formatted in accordance with the immediately preceding conventionally encoded instruction.

9. A method of encoding text, printer control, commands and instruction signals using a conventional character set which provides standard text and standard printer control codes in a transparent unstructured format on individual media so that after transmission and receipt they will be reproduced in the same unstructured format and on corresponding media comprising the steps of:

providing a command delimiter including a conventional line end signal (LE) and a conventional comma signal (,) immediately preceding each command to be transmitted for entering a command mode;

encoding a following command in conventional alphabetic characters of which at least the first character represents the command;

providing an instruction delimiter including a conventional line end signal (LE) for each concatenated instruction following a command;

encoding a following instruction in conventional alphabetic characters of which at least the first character represents the instruction;

providing a conventional page end (PE) character following commands and instructions as set forth above for terminating the command mode when the commands and instructions in the preceding command/instruction fields are the last field on the media; and providing a command delimiter as set forth above and an end (END) command following a command/instruction field for terminating the said field whenever the said field is followed by other encoded signals on the media which a recipient device must either decode or reproduce.

10. A method as set forth in claim 9 in which said commands and instructions encoded in conventional alphabetic characters are ordinary English words descriptive of the command or instruction and at least the first character of each identifies the command.

11. A method as set forth in claim 9 in which selected instructions include formatted conventionally coded numeric fields following the conventional alphabetic coded instruction for identifying system parameters.

12. A method as set forth in claim 9 in which the first three conventionally coded alphabetic characters of commands and instructions uniquely identify the commands and instructions whereby the remaining conventionally coded alphabetic characters are ignored by the recipient device and the immediately following conventionally encoded numeric characters are formatted in accordance with the immediately preceding conventionally encoded instruction.

* * * * *